United States Patent
Kurath

[15] 3,674,773
[45] July 4, 1972

[54] ERYTHROMYCIN DERIVATIVES
[72] Inventor: Paul Kurath, Waukegan, Ill.
[73] Assignee: Abbott Laboratories, North Chicago, Ill.
[22] Filed: Oct. 6, 1970
[21] Appl. No.: 78,633

[52] U.S. Cl. ........................................260/210 E, 260/999
[51] Int. Cl. ............................................C07c 47/18
[58] Field of Search.............................260/210 E

[56] References Cited

UNITED STATES PATENTS 3,417,077  12/1968  Murphy et al. ....................260/210 E
3,478,014  11/1969  Djokic et al. ......................260/210 E Primary Examiner—Lewis Gotts
Assistant Examiner—Johnnie R. Brown
Attorney—Robert L. Niblack

[57] ABSTRACT

The 8,9-anhydro-8,9-epoxyerythromycin 6,9-hemiketal, the 8,9-seco-8-oxoerythromycin-9-oic acid 6,9-lactone, and the 8-hydroxyerythromycin derivatives of both erythromycin A and B have antimicrobial activity, and the N-oxide intermediates thereof.

5 Claims, No Drawings

ERYTHROMYCIN DERIVATIVES

DISCLOSURE OF THE INVENTION

This invention relates to derivatives of erythromycin A and B which possess anti-microbial activity against *Staphylococcus aureus* together with intermediates for producing them that have the formula:

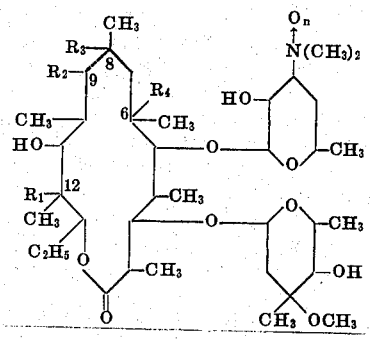

wherein $R_1$ is hydrogen or hydroxy and $R_4$ is hydroxy or an oxygen bridge between the 6,9-positions of the aglycone ring and n is an interger of from 0 – 1. When $R_4$ is hydroxy, $R_2$ is oxo, i.e. (O  ), and $R_3$ is a hydroxy group; when $R_4$ is an oxygen bridge between the 6,9-positions, $R_2$ and $R_3$ are each oxo or are joined together to form an epoxy linkage between the adjacent eight, nine-carbon atoms of the aglycone ring. Thus the dashed line between the 8-and 9-positions of the aglycone ring represents a chemical bond when $R_2$ is oxo and $R_3$ and $R_4$ are hydroxy groups. Similarly the dashed line between the 8,9-positions of the aglycone ring also represents a chemical bond therebetween when $R_2$ and $R_3$ form and epoxide linkage and $R_4$ is an oxygen bridge between the six, nine-carbon atoms of the aglycone ring. However, when $R_2$ and $R_3$ are oxo and $R_4$ is an oxygen bridge between the 6,9-positions, the electrons usually forming the 8,9-bond, share in the formation of the oxo groups and the structure represented is the 8,9-seco derivative.

Erythromycin A differs from erythromycin B in that the hydroxy group in the 12-position of the lactone ring is replaced by hydrogen. Thus in the formula above erythromycin A derivatives are indicated when $R_1$ is hydroxy and erythromycin B derivatives when $R_1$ is hydrogen.

The compounds of this invention are prepared from either erythromycin A or erythromycin B, as the case may be depending upon whether the A or B product form is desired.

In the preparation of the novel compounds of this invention, erythromycin A or B is first converted to the corresponding N-oxides wherein the amino nitrogen of the 3'-dimethylamino has been oxidized according to known techniques. The purpose of this conversion is to obviate the possibility of reaction at the site of the amino group.

The N-oxides are then oxidized further to yield a mixture of 8,9-anhydro-8,9-epoxyerythromycin 6,9-hemiketal N-oxide, 8,9-seco-8-oxoerythromycin-9-oic acid 6,9-lactone N-oxide, and 8-hydroxyerythromycin N-oxide. After these reactions are complete, the N-oxides are reduced to give the corresponding antimicrobial products which again have a dimethylamino substituent at the 3'-position of the desosamine sugar.

The preparatory scheme can be more clearly understood from the following specific examples in which the preparation of the erythromycin B derivatives is disclosed first, followed by illustrative examples for the preparation of the erythromycin A derivatives of this invention.

EXAMPLE I 8,9-Anhydroerythromycin B 6,9-Hemiketal N-Oxide

A solution of 2.44 g. of erythromycin B N-oxide prepared as taught by Wiley, et al., Journal American Chemical Society, 79,6070 (1957), in 10 ml. of glacial acetic acid was allowed to stand at room temperature for 2 hours. Most of the acetic acid was evaporated under reduced pressure on the steam bath. The residue was dissolved in $CHCl_3$, the organic extract was washed with water to neutrality. The $CHCl_3$ solution was dried over anhydrous $MgSO_4$, filtered, and evaporated to leave a crystalline residue of 2.21 g. A part of this sample, 0.75 g., was purified by chromotography on silica gel (75 g.). The residues from the ethyl acetate-methanol (1:1) eluates amounted to 0.57 g. This material was recrystallized from chloroform-n-heptane to yield 0.37 g. of crystals. Further recrystallization from the same solvent furnished an analytical sample of 8,9-anhydroerythromycin B 6,9-hemiketal N-oxide, which had a melting point range of 195°– 197° C.

Analysis calculated for $C_{37}H_{65}NO_{12}$: C, 62.07; H, 9.15; N, 1.96; O,26.82;

Found C, 62.25; H, 9.25; N, 1.69; O, 26.80

EXAMPLE 2

Hydrogen Peroxide — Osmium Tetroxide Oxidation of 8,9-Anhydro-erythromycin B 6,9-Hemiketal N-oxide To a solution of 5.30 g. of 8,9-anhydroerythromycin B 6,9-hemiketal N-oxide in 45 ml. of t-butyl alcohol there was added 3 ml. of an 0.5% osmium tetroxide solution in t-butyl alcohol and 30 ml. of hydrogen peroxide - t-butanol reagent, prepared according to the method of R.C. Hockett, et al., Journal American Chemical Society, 63, 2051 (1941), and the mixture was allowed to stand at room temperature for 133 days, after which time the solution was still slightly yellow. The solvent was evaporated under reduced pressure to leave a residue of 5.78 g. of crude reaction mixture containing at least three reaction products one of which was identified as 8,9-anhydro-8,9-epoxyerythromycin B 6,9-hemiketal N-oxide by thin layer chromotographic comparison with the sample prepared from 8,9-anhydroerythromycin B 6,9-hemiketal N-oxide by m-chloropebenzoic acid oxidation as in example 3. The isolation of the several individual reaction products was unsuccessful.

EXAMPLE 3

8,9-Anhydro-8,9-epoxyerythromycin B 6,9-Hemiketal N-Oxide

To a stirred suspension of 2.58 g. of m-chloroperbenzoic acid in 15 ml. of methylene chloride was added a solution of 3.58 g. of 8,9-anhydroerythromycin B 6,9-hemiketal N-oxide in 30 ml. of methylene chloride over a period of 15 minutes. The reaction mixture was stirred at room temperature overnight. The final solution was diluted with 200 ml. of methylene chloride and extracted in sequence with three 150-ml. portions of ice-cold sodium sulfite (2 percent) solution, three 150-ml. portions of ice-cold saturated sodium bicarbonate solution and 150 ml. of a saturated sodium chloride solution. The washes were extracted with two 200-ml. portions of methylene chloride. The organic extracts were dried over anhydrous magnesium sulfate, filtered, and evaporated to leave 2.45 g. of reaction product. An interphase was collected on a filter, 0.31 g, and shown to be identical to the methylene chloride extract obtained above by thin layer chromothography. The product contained some impurities and was not obtained in crystalline form.

EXAMPLE 4

Reduction of the N-Oxide Mixture

The solution of 1.01 g. of the crude mixture of 8,9-anhydro-8,9-epoxyerythromycin B 6,9-hemiketal N-oxide, 8,9-seco-8-oxoerythromycin B 9-oic acid 6,9-lactone N-oxide, and 8-hydroxyerythromycin B N-oxide in 150 ml. of absolute ethyl alcohol was hydrogenated in the presence of 1.00 g. of 5% Pd/C for three hours. The catalyst was collected on a filter and washed with several small portions of ethanol. The combined filtrates were evaporated to leave 0.85 g. of residue.

A part of this material, 0.478 g. was purified by chromatography on a silica gel partition column which was prepared and eluted according to the method described by Oleinick, et al., Journal of Biological Chemistry, 244 727(1969). A pure substance, 38 mg. of 8,9-anhydro-8,9-epoxyerthromycin B 6,9-hemiketal, was eluted first. The $R_f$ value of this compound was found to be 0.26 in a thin layer chromatographic system on silica gel using methylene chloride-methanol-ammonia (90:10:1) as the mobile phase. The structural assignment to this substance was based on its 100 MHz nmr spectrum.

From later eluates of the above chromatogram 33 mg. of pure 8,9-seco-8-oxoerythromycin B-9-oic acid 6,9-lactone was obtained after evaporation of the solvent. This compound had an $R_f$ value of 0.34 in the same thin layer chromatographic system. Again the structural assignment of the new compound was based on its 100 MHz nmr spectrum.

The residues from the last eluates from the partition column amounted to 83 mg. of pure 8-hydroxyerythromycin B; in the above mentioned thin layer chromatographic system this compound had an $R_f$-value of 0.22. This substance was likewise identified by its 100 MHz nmr spectrum.

EXAMPLE 5

8,9 Anhydroerythromycin A 6,9-Hemiketal N-Oxide

A 10.0 g. portion of erythromycin A N-oxide which was obtained according to the method described by Flynn, et al. in The Journal of the American Chemical Society, 76, 3121 (1954) was dissolved in 50 ml. of acetic acid, was allowed to stand at room temperature for three hours with occasional stirring. Most of the acetic acid was then removed under reduced pressure, the residue then being dissolved in 500 ml. of chloroform and washed with 400 ml. of an ice-cold aqueous solution saturated with sodium bicarbonate, followed by two washes with 200 ml. of water. The aqueous washes were extracted with two-400 ml. portions of $CHCl_3$, the organic extracts were dried over anhydrous $MgSO_4$, filtered and evaporated to a small volume. Heptane was added until crystallization started and the mixture was allowed to cool. The crystals were collected in a yield of 6.50 g. and had a melting point range of 182°–184° C.

Analysis calculated for $C_{37}H_{65}NO_{13}$: C, 60.71; H, 8.95; N, 1.91; O, 28.42;

Found: C, 60.60; H, 9.25; N, 2.11; O, 28.19

EXAMPLE 6

Hydrogen Peroxide-Osium Tetroxide Oxidation of 8,9-Anhydro-Erythromycin A 6,9-Hemiketal N-Oxide The solution of 5.42 g. of the compound prepared in Example 5 in 45 ml. of t-butyl alcohol is trated with 3 ml. of an 0.5 percent osmium tetroxide solution in t-butyl alcohol and 30 ml. of hydrogen peroxide t-butyl alcohol reagent (cf. R. C. Hockett, et al., Journal American Chemical Society, 63, 2051 (1941) and allowed to stand at room temperature for 130 days. After a work-up similar to that employed in Example 2 a crude reaction mixture is isolated which is reduced over palladium on carbon as outlined in Example 7.

EXAMPLE 7

Reduction of the N-Oxide Mixture of Example 6

The solution of 1.00 g. of the crude reaction mixture obtained in Example 6 is dissolved in 150 ml. of ethyl alcohol and hydrogenated in the presence of 1.00 g. of 5 percent Pd/C for three hours. The catalyst is collected on a filter and washed with several small portions of ethyl alcohol. The combined filtrates are evaporated and the residue is chromatographed on a partition column as in the case of the corresponding mixture of Example 4. The substances eluted in sequence are 8,9-anhydro-8,9-epoxyerythromycin A 6,9-hemiketal, 8,9-seco-8-oxoerythromycin A-9-oic acid 6,9-lactone, and 8-hydroxyerythromycin A. As in Example 4, these substances are characterized by their $R_f$-values in thin layer chromatography and their 100 MHz nmr spectra.

The antibiotic spectrum against selected organisms is shown in the following table. The erythromycin derivatives were tested by the agar dilution method. Two-fold dilutions were made and plates poured with 10 ml. Brain Heart Infusion Agar. Plates were streaked with a loopful of a 1:100 dilution of a 24 hour broth culture for all organisms with the exception of *Staphylococcus* which was used undiluted. Plates were incubated 24 hours at 37° C.

In the table A, B and C refer to 8,9-anhydro-8,9-epoxyerythromycin B 6,9-hemiketal; 8,9-seco-8-oxoerythromycin B-9-oic acid 6,9-lactone; and 8-hydroxyerythromycin B, respectively. The corresponding erythromycin A derivatives exhibit similar spectrums and levels of activity.

MINIMUM INHIBITORY CONCENTRATION

IN Mcg/ml

| Organism | A | B | C |
| --- | --- | --- | --- |
| *Staph* aureus 45 | 3.1 | 25 | 0.78 |
| *Staph.* aureus 209P | 3.1 | 25 | 0.78 |
| *Strep.* faecalis 10541 | 0.78 | 6.2 | 0.39 |
| *Strep.* faecalis Blaschke | 100 | 100 | 12.5 |
| *Klebsiella* pneumoniae 10031 | 100 | 100 | 6.2 |
| *Pasturella* multocida 10544 | 50 | 100 | 6.2 |

The compounds of this invention, if N-oxide derivatives are useful for the preparation of the corresponding reduced derivatives. In use the reduced species of the compounds of this invention, that is those having dimethylamino in the 3'-position rather than dimethylamino N-oxide can be used as an antiseptic solution to lower the level of pathogenic organisms, especially var. *Staphylococcus*, that are found on a variety of surfaces such for example as medical or dental equipment. An aqueous solution of the compound of this invention, suitably in the salt e.g., hydrochloride form to aid in solubility, is swabbed on the surface that is desired to be treated. The concentration should be at least above the minimum inhibitory concentration and preferably in the range of 100–200 mcg/ml.

I claim:

1. The compounds of the formula

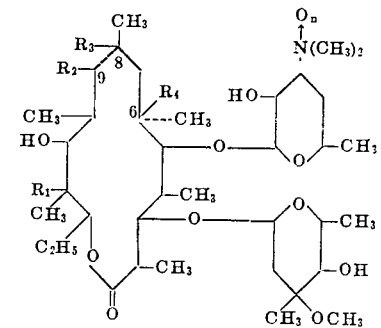

wherein $R_1$ is hydrogen or hydroxy; $R_4$ is hydroxy or an oxygen bridge between the 6,9-positions of the lactone ring; when $R_4$ is hydroxy, $R_2$ is oxo and $R_3$ is hydroxy; and when $R_4$ is an oxygen bridge between the 6,9-positions, $R_2$ and $R_3$ are each oxo or are joined together to form an epoxy linkage between the vicinal carbon atoms of the 8,9-positions, and $n$ is an integer of from 0 to 1.

2. A compound according to claim 1 in which $R_4$ is hydroxy, $R_2$ is oxo, $R_3$ is hydroxy, and $n$ is 0, namely 8-hydroxyerythromycin.

3. A compound according to claim 1 in which $R_4$ is an oxygen bridge between the 6,9-positions, $R_2$ and $R_3$ are each oxo, and $n$ is 0, namely, 8,9-seco-8-oxoerythromycin-9-oic acid 6,9-lactone.

4. A compound according to claim 1 in which $R_4$ is an oxygen bridge between the 6,9-positions, $R_2$ and $R_3$ are joined together to form an epoxy linkage between the vicinal carbon atoms of the 8,9-positions, and $n$ is 0, namely 8,9-anhydro-8,9-epoxyerythromycin 6,9-hemiketal.

5. A compound according to claim 1 in which $n$ is 1.

* * * * *